United States Patent
Fischer et al.

(10) Patent No.: US 10,429,202 B2
(45) Date of Patent: Oct. 1, 2019

(54) METHODS AND SYSTEMS FOR GENERATING ROUTES USING ELECTRONIC MAP DATA

(71) Applicant: TomTom Navigation B.V., Amsterdam (NL)

(72) Inventors: Johannes Robert Fischer, Berlin (DE); Tetyana Dzyuba, Berlin (DE); Felix Godafoss König, Berlin (DE); Sijtse Thomas Goverts, Haarlem (NL)

(73) Assignees: TOMTOM NAVIGATION B.V., Amsterdam (NL); TOMTOM INTERNATIONAL B.V., Amsterdam (NL)

( * ) Notice: Subject to any disclaimer, the term of this patent is extended or adjusted under 35 U.S.C. 154(b) by 46 days.

(21) Appl. No.: 15/275,535

(22) Filed: Sep. 26, 2016

(65) Prior Publication Data

US 2017/0276502 A1    Sep. 28, 2017

(30) Foreign Application Priority Data

Mar. 28, 2016 (EP) .................................... 16162511

(51) Int. Cl.
*G01C 21/36* (2006.01)
*G01C 21/34* (2006.01)

(52) U.S. Cl.
CPC ....... *G01C 21/3614* (2013.01); *G01C 21/343* (2013.01); *G01C 21/3446* (2013.01)

(58) Field of Classification Search
CPC .............. G01C 21/3453; G01C 21/343; G01C 21/3446; G01C 21/3676

(Continued)

(56) References Cited

U.S. PATENT DOCUMENTS 6,192,314 B1  2/2001 Khavakh et al.
6,567,743 B1  5/2003 Mueller et al.
(Continued)

FOREIGN PATENT DOCUMENTS

DE   102012213357 A1   1/2014
JP      2007078530 A    3/2007
(Continued)

OTHER PUBLICATIONS

Search Report dated Oct. 11, 2016 for EP Application No. 16162511.6.

*Primary Examiner* — Muhammad Shafi

(57) ABSTRACT

A method and system for generating a route through a navigable network in a geographic area is disclosed, the navigable network being represented by an electronic map comprising a plurality of segments each having a traversal direction associated therewith. An area is defined around a location represented by the electronic map, and at least some of the outgoing segments from the area are determined. A first optimum cost route from an origin is determined to each of the determined outgoing segments, and these routes are ranked according to their cost. At least one of the first optimum cost routes is selected based on the ranking, and a second optimum cost route is determined from the outgoing segment from the area of the selected route to a destination. The generated route from the origin to the destination comprises the selected first optimum cost route and the second optimum cost route.

20 Claims, 8 Drawing Sheets

(58) Field of Classification Search
USPC .......................................................... 701/428
See application file for complete search history.

(56) References Cited

U.S. PATENT DOCUMENTS

| | | | |
|---|---|---|---|
| 2005/0071077 A1* | 3/2005 | Kadono | G01C 21/34 |
| | | | 701/420 |
| 2008/0208445 A1 | 8/2008 | Bolton et al. | |
| 2011/0282573 A1* | 11/2011 | Ting | G01C 21/34 |
| | | | 701/533 |
| 2011/0301830 A1* | 12/2011 | Tate, Jr. | G01C 21/3461 |
| | | | 701/420 |
| 2012/0072107 A1 | 3/2012 | Okude et al. | |
| 2015/0095122 A1* | 4/2015 | Eramian | G07B 15/00 |
| | | | 705/13 |
| 2015/0168171 A1 | 6/2015 | Tanizaki et al. | |
| 2016/0003620 A1* | 1/2016 | Kapoor | G01C 21/00 |
| | | | 701/400 |

FOREIGN PATENT DOCUMENTS

| | | | |
|---|---|---|---|
| WO | WO-2008125376 A1 * | 10/2008 | |
| WO | WO-2008125376 A1 * | 10/2008 | ......... G01C 21/3446 |

\* cited by examiner

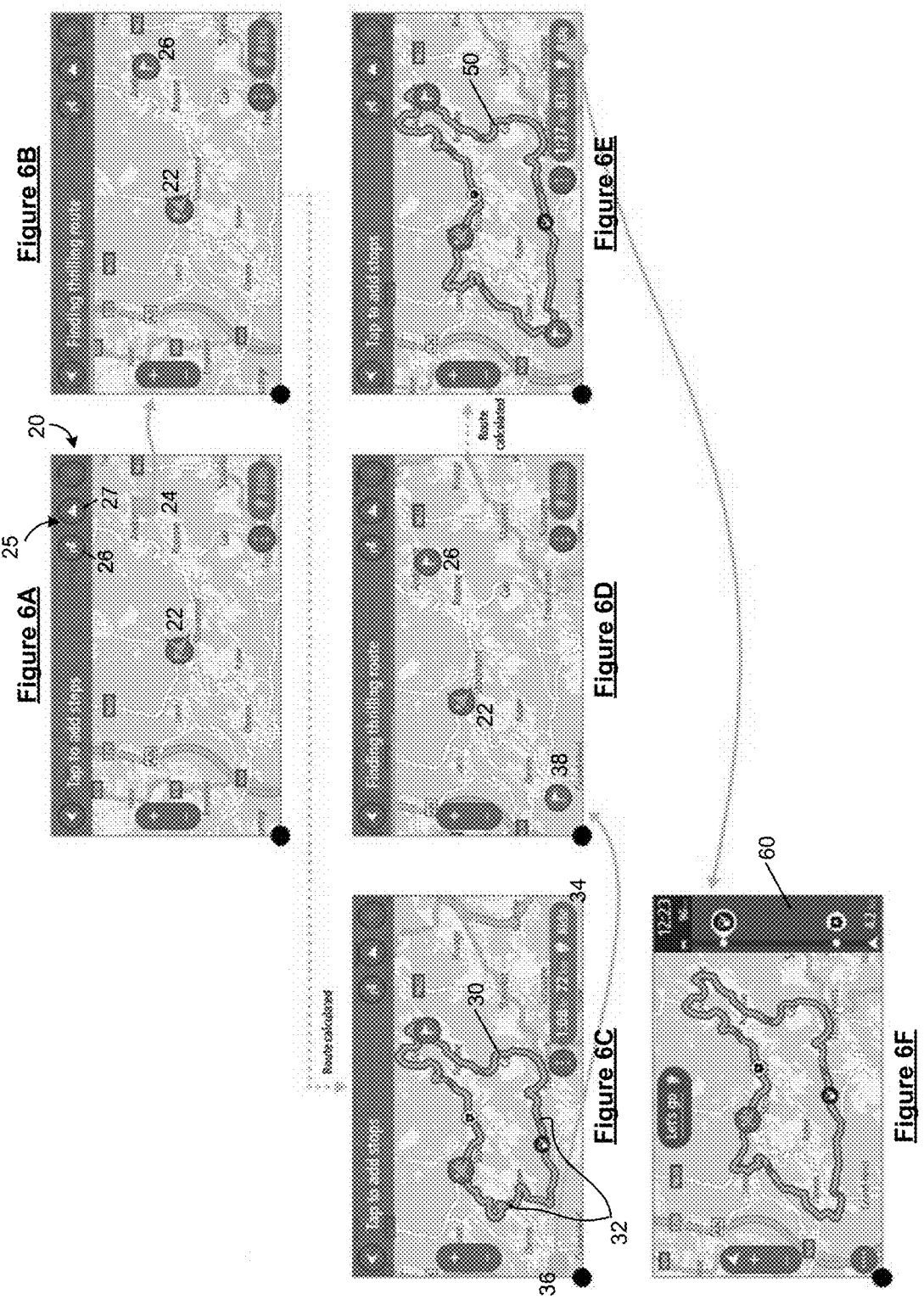

METHODS AND SYSTEMS FOR GENERATING ROUTES USING ELECTRONIC MAP DATA

CROSS REFERENCE TO RELATED APPLICATIONS

This application claims the benefit of European Patent Application No. 16162511.6 filed Mar. 28, 2016. The entire content of this application is incorporated herein by reference.

FIELD OF THE INVENTION

This invention relates to methods and systems for generating routes passing through one or more defined areas, and also extends to navigation devices and servers arranged to generate such routes. The present invention thus relates to generating routes from, via and/or to defined areas associated with point locations, rather than specific locations. The present invention in its various aspects is particularly, although not exclusively, useful in generating a route between an origin and a destination that are the same i.e. an "A-A" type round trip route. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning functionality, and preferably also navigation functionality.

BACKGROUND TO THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions. Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

Considerable efforts have been devoted to developing navigation systems that are of utility in generating routes between specific origin and destination locations, optionally via certain specific waypoint locations. However, in various contexts, it is desirable to be able to generate a route from, to, or via a more general area, rather than a specific location, such that the route only has to start or end in, or pass through the area, rather than a specific location. For example, in some circumstances, a user may wish to obtain a suggestion as to an interesting route, or a route going via certain general areas, without being so concerned by the exact locations included on the route. Such routes may often be round trips, i.e. routes having same origin and destination, also often referred to as A-A type routes, although this is not necessarily the case. Generating such routes that are of interest to a user, and taking into account any preferences of the user as to regions visited, may pose certain particular challenges in comparison to simply determining a most efficient route between or via specific locations. Being able to generate routes that start from or end in, or go via certain general areas may also be of utility in other contexts, where the areas are not necessarily user specified.

Certain techniques for generating routes passing through particular regions, rather than specific locations, have been proposed in U.S. Pat. No. 6,567,743 B1. However, the Applicant has realised that there remains scope to further improve on such methods.

SUMMARY OF THE INVENTION

In accordance with a first aspect of the invention there is provided a method of generating a route through a navigable network in a geographic area, the navigable network being represented by an electronic map comprising a plurality of segments representing navigable elements of the navigable network, the plurality of segments being connected by nodes, and each segment having a traversal direction associated therewith, the method comprising:

receiving location data identifying a location represented by the electronic map;

defining an area represented by the electronic map based on the received location data;

determining at least some of the outgoing segments from the defined area;

determining, for each of the determined outgoing segments from the defined area, a first optimum cost route from an origin to the respective outgoing segment using a route planning algorithm, each first optimum cost route having an associated cost;

selecting at least one of the first optimum cost routes based on the associated cost; and determining a second optimum cost route to a destination from the outgoing segment from the area of the at least one selected first optimum cost route, wherein the generated route from the origin to the destination comprises the selected first optimum cost route and the second optimum cost route.

The present invention provides a method of generating a route between an origin and destination which passes through a defined area of the electronic map. The area is based on location data identifying a location represented by the electronic map. The location is preferably a point location, but it can also be an area, which can be the same as the defined area, or a different area on which the defined area is based. The term "point location" is used herein to refer to a specific location in contrast to an area, and which includes a sub region of the electronic map. The point location may, for example, be defined as a longitude-latitude coordinate pair. The point location be correspond to the position of node of the electronic map, or it may be a location along a segment of the electronic map. In other embodiments, the point location may correspond to the location of a POI, or a location within a POI (if the POI refers to an area, such as a park). The received locations, which define an area, may be referred to herein as "soft waypoints", in contrast to normal "hard waypoints". As will be appreciated, when a routing engine determines a route via a hard waypoint, then the route is required to include that location. In contrast, with a soft waypoint, the routing engine is arranged to generate a route that passes through the area associated with the point location defining the soft location, but is not required to include the point location itself. In other words, the soft waypoint incorporates a certain fuzziness, so as to allow a route to pass through any part of the area associated with the location.

The present invention extends to a system for carrying out a method in accordance with any of the aspects or embodiments of the invention herein described.

Thus, in accordance with a further aspect of the invention there is provided a system for generating a route through a navigable network in a geographic area, the navigable network being represented by an electronic map comprising a plurality of segments representing navigable elements of the navigable network, the plurality of segments being connected by nodes, and each segment having a traversal direction associated therewith, the system comprising:

means for receiving location data identifying a location represented by the electronic map;

means for defining an area represented by the electronic map based on the received location data;

means for determining at least some of the outgoing segments from the defined area;

means for determining, for each of the determined outgoing segments from the defined area, a first optimum cost route from an origin to the respective outgoing segment using a route planning algorithm, each first optimum cost route having an associated cost;

means for selecting at least one of the first optimum cost routes based on the associated cost;

means for determining a second optimum cost route to a destination from the outgoing segment from the area of the at least one selected first optimum cost route, wherein the generated route from the origin to the destination comprises the selected first optimum cost route and the second optimum cost route.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa. The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The system of the present invention in any of its aspects or embodiments may be in the form of any suitable device, such as a navigation device. In general, the system of the present invention may be at least one processing device. The or a processing device may be a device of a mobile device, such as a navigation device, whether a portable navigation device (PND) or an integrated device, or may be a device of a server.

The method of the present invention is preferably implemented in the context of a navigation operation. Thus, the method is preferably carried out by a set of one or more processors of a device or system having navigation functionality. However, it will be appreciated that the methods may also be carried out by any suitable system having route generating capability, but not necessarily navigation functionality. For example, the methods may be implemented by a computer system, e.g. a desktop or laptop system, which does not have navigation functionality. A user may be presented with a generated route which may then be printed or otherwise used to aid route selection at a subsequent time, or, for example, the routes may be stored for future use, e.g. downloading to a navigation device.

In preferred embodiments the method of the present invention in any of its aspects or embodiments is carried out using a mobile device, such as a navigation device, and the present invention extends to a mobile, e.g. navigation device arranged to carry out the steps of the method of any of the aspects or embodiments of the invention. The navigation device may be a portable navigation device (PND) or an integrated, e.g. in-vehicle, device.

In accordance with any of the aspects or embodiments of the invention the system, e.g. navigation device, may comprise a display for displaying an electronic map to a user, a set of one or more processors configured to access electronic map data and cause an electronic map to be displayed to a user via the display, and a user interface operable by a user to enable the user to interact with the device.

Regardless of its implementation, a device, e.g. navigation apparatus, used in accordance with the present invention in any of its aspects or embodiments may comprise a processor, memory, and digital map data (or electronic map) stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include global navigation satellite system (GNSS), e.g. GPS or GLONASS, signal reception and processing functionality. As will be appreciated the navigation apparatus may use other means for determining its current location as desired, e.g. terrestrial beacons, the mobile telecommunications network, etc. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments the method of the present invention in any of its aspects or embodiments may be carried out by a server, and the present invention extends to a server arranged to carry out the steps of the method of any of the aspects or embodiments of the invention. The system of the present invention of any of its aspects or embodiments may be a system e.g. processing device of a server. Of course, the steps of the method of the present invention in any of its aspects or embodiments may be carried out in part by a server and in part by a navigation apparatus. For example route generation may be carried out by a server, e.g. at the request of a navigation device, and provided to the device for output to a user. The steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication. Thus, the system of the present invention may be provided in part by a navigation device or other mobile device, and in part by a server.

The navigable network is represented by an electronic map. The electronic map comprises a plurality of segments connected by nodes. The electronic map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. The nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the legal speed limit, etc. The segments also have an associated traversal direction, the traversal direction indicates the possible direction(s) that the segment can be travelled along. For example, when the navigable network is a road network, a segment may be representative of a one-way road, or it may be representative of the lanes on one side of a highway, and thus the segment would be mono-directional, i.e. allowing travel from one node to another node, but not in the other direction. Alternatively, and as is typically more often the case, the segment may be bi-directional, i.e. allowing travel from one node to another node, and vice versa. A bi-directional segment can therefore always be an outgoing segment from an area of a soft location, but this is not the case with a mono-directional segment.

While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments.

The generated route is between an origin and a destination, via at least one waypoint. In some preferred embodiments the origin is a current location of the user, and may also be the destination in the case of an A-A type route (or round trip). For example, when an A-A type route mode is selected, or inferred, then the origin may automatically be taken additionally as the destination for a route. However, it is envisaged that the origin and/or destination may be any location, whether selected by a user or automatically.

In the present invention, location data identifying a location is received, e.g. from a user, and an area is defined based on the received location data. The location is preferably a point location, but it can also be an area, which can be the same as the defined area, or a different area on which the defined area is based. In embodiments, where the location is a point location, then the area can be defined as a circle centred on the point location. The circle can be of a predetermined radius, e.g. with the radius optionally being provided by the user. The radius may be a preset radius, e.g. 500 m, 1 km or any other value as desired. The indication of a point location may be obtained directly or indirectly from a user, e.g. through the user uploading data indicative of the point locations, or directly interacting with a navigation device to indicate the locations. An indication may be provided using any suitable user input or inputs. A point location may be indicated by interaction of the user with a displayed representation of at least a portion of the electronic map. For example, the indication may be provided by the user touching a touchscreen of a device. The size of the area may be specified directly by the user, or may be inferred based upon the one or more user inputs. For example, the area may be a circle having a radius determined based upon a length of a time that a user presses the point location. In some embodiments in which a point location is user specified, the method comprises displaying to the user a circle centred on the point location indicated by the user, the radius of which circle increases over time, for the period that the user continues to press the point location. The radius of the circle is set when the user stops pressing the point location. In this way, the user first defines the point location, and then the area based thereon. One or more, or preferably a plurality of point locations indicative of waypoints, may be received from a user, e.g. in embodiments where a route is determined through a plurality of soft waypoints as will be discussed in more detail below.

While a defined area obtained, whether automatically, or based upon user input(s), may be used directly in the remainder of the method, in some embodiments, the area is subjected to verification to ensure that it is suitable for further use. The area defined in accordance with any of the embodiments described above may therefore be an initial area which is subject to verification, and if appropriate, modification, in order to provide a defined area for use in accordance with the invention. The present invention relies upon identifying segments outgoing from the area for use in the route generation process. In order to be able to do this, the area defined should encompass a sufficient portion of the navigable network represented by the electronic map to enable at least one, and preferably a plurality of such outgoing segments to be identified.

The step of defining the or an area may comprise defining an initial area based on the received location data in accordance with any of the above described methods, verifying whether the area covers an appropriate portion of the navigable network as represented by the electronic map, and, where the area is found not to cover an appropriate portion of the network, i.e. to be of insufficient size, increasing the area until the area is found to be to cover an appropriate portion of the network, i.e. to be of sufficient size. For example, the area may be increased by increasing the radius defining the area. The area may be increased continually, or incrementally. For example, the area may be increased in 1 km increments, or in increments of any predetermined size as desired. This may be necessary where an initial area corresponds to an area of a park, which may have no segment therethrough. In some embodiments the area is increased incrementally, and checked after each increase to determine whether the increased area covers an appropriate portion of the network, i.e. is of sufficient size. Once an area of appropriate size is reached, whether or not increase of an initial area was required, the area is taken as the defined area for use in the remainder of the method. In some embodiments, the appropriate portion of the network may be a portion such that there is at least one outgoing segment from the area. However, preferably the appropriate portion of the network is a portion such that there are at least a predetermined number of outgoing segments from the area, wherein the predetermined number is two or more. In some embodiments, the number is two. It is envisaged that the number may be increased to increase the number of outgoing segments available, and hence the number of minimum cost routes that are determined and considered. It will be appreciated that verification may be carried out in respect of any one or ones, or each area that is defined based on a user indicated point location in accordance with the invention.

The steps below may be carried out in relation to the or a given area. Once a given area has been defined, whether or not after verification of an initial area, and, if appropriate, increased in size to provide the given defined area, the method comprises determining the outgoing segments from the defined area. At least some, and preferably each, outgoing segment associated with the area is identified, and the set corresponds to each of the outgoing segments of the area. There may be one or more such segments, and preferably a plurality of outgoing segments. This step, and the subsequent steps of generating a route or routes to or from the area is performed for one or more, or preferably each given area that is defined. Any of the steps described in relation to the given area below, are equally applicable to any further area. The steps may be carried out sequentially for each area to be encountered along the route, e.g. for whichever is present.

The method comprises identifying a set of one or more of the outgoing segments associated with the given area, and, for each segment of the set, determining an optimum, preferably minimum, cost route through the navigable network as represented by the electronic map from the origin to the outgoing segment, with the outgoing segment providing the destination of the determined route. This will provide one or more possible routes from the origin through the area. The origin may be a point location, such as a current location of a user, or, in the case where the area is not a first soft waypoint, the origin can be an outgoing segment from a previous area. The origin or waypoint will form the origin of the route search in this step. Outgoing segments are identified as this ensures that each of the determined routes must pass through the area, rather than simply entering the area and then immediately exiting the area along the same path due to a U-turn being permitted or by doubling back into the area after exiting.

Each determined route for the given area is an optimum, preferably minimum, cost route, and is determined using a route search algorithm, such as one based on Dijkstra's algorithm or similar. Thus, where a plurality of possible routes are determined, each is an optimum route. Where a route is an optimum (or minimum cost) route as referred to herein, the route is optimal by reference to the applicable cost function that is being used for route generation. The cost function may be predetermined, or selected by the user as desired, and may aim to generate routes between two locations having, for example, a shortest distance between the two locations, a fastest travel time between the two locations, a desired degree of hilliness encountered between the two locations, a desired degree of windiness encountered between the two locations, a minimum fuel consumption between the two locations, or any combination of these as desired. The cost of a route may be determined as the sum of the cost of traversing the at least one segment forming the route, wherein the cost for traversing each segment is determined using the cost function and typically at least one attribute associate with the respective segment, e.g. a length of the segment, an expected speed of travel along the segment, changes in elevation along the segment, a curvature (or shape) of the segment, etc.

The method comprises selecting at least one of the first optimum cost routes based on the associated cost. In embodiments, the method comprises ranking the determined optimum, e.g. minimum, cost routes through the defined area, i.e. the first optimum cost routes, according to their cost, and selecting at least one of the first optimum cost routes based on the ranking. The ranking will typically order the outgoing segments from the defined area based on the cost of the route to each outgoing segment. This ranking allows, for example, the outgoing segments to be ordered from minimum cost to maximum cost, or from maximum cost to minimum cost as desired. Based on the ordering, a set of best starting points from the defined area can be identified. This set will typically comprise at least one, and preferably a predetermined number of, outgoing segments. For example, five outgoing segments can be identified; although this number is merely exemplary. In embodiments, the set will therefore include at least the outgoing segment associated with the minimum cost route with the lowest cost, and typically one or more of the next lowest outgoing segments up to the predetermined number.

The method further comprises determining an optimum, e.g. minimum, cost route from each of the set of selected outgoing segments to a destination. The routes are preferably determined using the same routing algorithm, and thus same cost function, as used to determine the routes from the origin to the outgoing segments from the defined area. A route between the origin and destination, and which passes through the defined area, can then be selected as the route having the optimum cost over the two legs, i.e. from the origin to the area (optionally though one or more other areas), and from the area to the destination (optionally through one or more other areas). As will therefore be appreciated, when a route passes through multiple areas, i.e. due to a plurality of soft waypoints being used, the portion of the route between each area may not itself be an optimum route, since the method operates to find the optimum route between the origin and the destination.

In embodiments in which a plurality of routes are determined to or from respective ones of a set of a plurality of outgoing segments associated with the given area, the routes may be determined simultaneously or sequentially, e.g. by one or more passes of a routing algorithm. This will provide a set of a plurality of possible routes between the applicable locations. It will be appreciated that in any of the embodiments of the invention in which multiple sets of routes are determined in respect of an area or areas, e.g. incoming and/or outgoing routes for one or more areas, each such set of routes may be determined sequentially or simultaneously as described in relation to the given area.

Although not explicitly mentioned above, it is envisaged that the destination in any of the embodiments discussed, could be defined itself as an area associated with a point location. The method may then comprise identifying each outgoing segment from the area indicative of the destination, and generating a plurality of possible routes from the outgoing segment at the first, or preceding area (where multiple waypoints are used) associated with an optimum route to each outgoing segment of the destination. The optimum such route may then be selected to provide the portion of the route from the first area or preceding area, if not the first, to the destination area. Alternatively, in preferred embodiments, at least some e.g. an optimum and limited number of routes to the first, or preceding area may be identified, and optimum routes generated from the outgoing segment at the first or preceding area associated with each such route to each outgoing segment at the destination area. The combination of routes for each leg which provides the optimum overall route from the origin to the destination may then be selected.

In accordance with any of the embodiments of the invention, where the point locations are specified by a user, the number of point locations indicative of waypoints that may be specified by a user may be limited, e.g. to 3, so as to minimise complexity in calculating the route. However, this is not always the case, and whether or not any limit is required, may depend upon the capabilities of the systems involved in determining routes, and the methods employed, e.g. whether multiple routes are considered at each stage, or an optimum route is selected at an area, and an outgoing segments associated therewith used as the origin for a continuation of the route.

In embodiments in which more than one point location is defined by a user, whether in respect of waypoints, or in respect of a destination or origin, or a combination thereof, the point locations may all be indicated prior to route generation commencing, or it is envisaged that the user may add or modify point locations subsequently, e.g. after at least a portion of the route has been generated. This may necessitate regeneration of the route e.g. in view of the addition or removal of a point location, or a change in the order of the point locations. The generation of a route referred to herein may be an initial generation of a route in view of a first set of one or more point locations indicated by the user, or a subsequent generation of a route based on a modified set of one or more point locations indicated by the user e.g. following the addition, deletion and/or modification of one or more point locations. It is also envisaged that the generation of the route may occur at different times. For example, a first portion might be generated based upon a point location indicative of a single waypoint that is initially indicated. If a further point location indicative of a further waypoint is subsequently added, the first portion of the route to the first waypoint may be retained, and a new second portion determined from the first waypoint to the second waypoint and then to the destination. However, typically the entire route will be recalculated if there is a change to the point locations indicated, allowing the route to be more easily optimised as a whole. Reference may be made herein to adding, removing or ordering point locations indicative of an origin, destination or waypoint. It will be appreciated that the point locations are of course indicative of a "soft" origin, destination or waypoint, i.e. regions through which the route is to pass, or at which the route is to begin or end, rather than specific point locations which must be included in the route.

The method may comprise receiving from a user an indication of a plurality of point locations indicative of waypoints to be included in the route between the origin and destination, and an indication of an order of the point locations along the route. The data indicative of the order of the point locations may be determined from an order in which the user indicates each point location. This may then provide the direction of travel through the regions. Alternatively or additionally, the method may comprise receiving an indication of a desired direction of travel between the point locations. For example, the user may provide an appropriate gesture indicating clockwise or anticlockwise travel between the point locations. The method may comprise storing data indicative of an order in which the point locations are to be traversed. In yet other embodiments, it is envisaged that a direction of travel through the regions may be determined automatically.

In some embodiments, it is envisaged that the user may change the order of at least some of the indicated point locations. For example, the user may be able to indicate a new direction of travel using an appropriate gesture, or may be able to touch or otherwise manipulate icons indicative of the point locations to indicate a new order. The order of the point locations following this reordering step may then be stored as a new order associated with the point locations (and hence the regions indicated thereby); the new order replacing the previous order.

Similarly, a user may modify the point locations. For example, in addition or alternatively to changing the order of the point locations, a user may add or delete one or more point locations indicative of regions through which the route is desired to pass between the origin and destination. As will be appreciated, at least when adding a new point location to the route, the user may indicate the position of the new point location in the order associated with the route.

It is envisaged that the modification, or reordering of point locations, e.g. by the addition or deletion of one or more point locations and/or by reordering the point locations, may occur after an initial route between the origin and destination has been determined. In such embodiments, the route generation method will generally be repeated taking account of the modifications that have been made to the point locations. The step of defining an area will be carried out for any new point location. Modification or reordering of point locations by a user may be carried out in any way, through direct or indirect action of the user.

In embodiments, after a route between an origin and destination passing through one or more areas associated with respective point locations indicated by a user has been generated, a user can indicate that a "reverse" route is desired to be determined. In the reverse route, the route is determined taking the point locations in the inverse order i.e. so as to pass through the or each area associated with an indicated point location in the inverse of the direction associated with the initially generated route. These embodiments are particularly applicable where the route is an "A-A" type route, having an origin and a destination that are the same.

The Applicant has realised that in accordance with any of the aspects or embodiments of the invention, when determining a second or subsequent leg of the route between the origin and destination, which route continues beyond a first waypoint to a further waypoint or the destination, it is desirable that the second or subsequent leg does not return immediately back toward the origin, or previous waypoint. This is particularly the case where the route of the A-A type, having the same origin and destination, especially where there is only one waypoint, although the techniques that will now be described are of wider applicability, and are not limited to this type of route. Some techniques to avoid the continuation of the route undesirably returning along the previous leg of the route will now be described, which may be applied to any of the embodiments described above.

In accordance with the aspects of the invention described above, where the given area is indicative of a waypoint, when determining a continuation of the route from an outgoing segment associated with the given area (or any other area) to a waypoint or destination, the method preferably comprises preventing any segment connecting two nodes of the electronic map indicative of consecutive nodes of the navigable network, which consecutive nodes of the navigable network also form part of a determined route from the origin or waypoint to the outgoing segment, from forming part of the continuation of the route to the destination or waypoint. The nodes are real world nodes which appear as consecutive nodes in the route from the origin or waypoint to the given area i.e. the incoming route. This is applicable whether a continuation of the route is determined from only a single outgoing segment at the given area, or whether multiple possible routes providing a continuation of the route are determined from a plurality of outgoing segments associated with possible routes from the origin or to the given area e.g. forming one of the optimum and a limited number of next most optimal routes are determined.

In embodiments in which the area is indicative of a waypoint, and the method comprises identifying a set of one or more outgoing segments associated with the area, and for each one of the set of one or more outgoing segments, determining a route through the navigable network from the origin or a waypoint to the outgoing segment, with the outgoing segment providing the destination of the determined route, thereby providing a set of one or more possible routes from the origin or the waypoint to and through the given area, and identifying a set of one or more outgoing segments associated with the area, and for each one of the set of one or more outgoing segments, determining a route through the navigable network from the outgoing segment to the destination or a waypoint, with the outgoing segment providing the origin of the determined route, thereby providing a set of one or more possible routes from the given area to the destination or a waypoint, the method may comprise preventing any segment connecting two nodes of the electronic map indicative of consecutive nodes of the navigable network, which consecutive nodes of the navigable network also form part of a determined route from the origin or waypoint to an outgoing segment, from forming part of a route from the outgoing segment to the destination or waypoint.

The determined route from the origin or waypoint to the outgoing segment whose segments are prevented from being included in a continuation of the route may be any one of a set of one or more possible routes determined from the origin or waypoint to the outgoing segment. Where a plurality of possible routes are determined, the route may be an optimum one of the routes. In some embodiments where a plurality of possible routes are determined from the origin or waypoint to respective outgoing segments at the given area, the method may comprise preventing any segment connecting two nodes of the electronic map indicative of consecutive nodes of the navigable network, which consecutive nodes of the navigable network also form part of any one of at least some of the plurality of other possible routes determined from the origin or waypoint to the given area, from forming part of the continuation of the route to the destination or waypoint. The at least some of the plurality of other possible routes preferably include or correspond to an optimum and limited number of next optimal routes between the origin or waypoint and the given area where the plurality of possible routes are ranked according to optimisation. In some embodiments the method may comprise preventing any segment connecting two nodes of the electronic map indicative of consecutive nodes of the navigable network, which nodes of the navigable network also form part of any one of the plurality of other possible routes determined from the origin or waypoint to the given area, from forming part of the continuation of the route to the destination or waypoint.

It is believed that these techniques, e.g. preventing any segment connecting two nodes of the electronic map indicative of consecutive nodes of the navigable network, and which form a first route from a origin to a waypoint, from being included in a second route from the waypoint to a destination, are advantageous in their own right.

Thus, according to a further aspect of the invention there is provided a method of generating a route between an origin and a destination through a navigable network in a geographic area via a waypoint, the navigable network being represented by an electronic map comprising a plurality of segments representing navigable segments of the navigable network, the method comprising:

determining a first minimum cost route from the origin to the waypoint according to a cost function by exploring a first set of segments of the electronic map using a route search algorithm;

identifying the one or more segments forming the first minimum cost route, and defining a second set of segments comprising said identified one or more segments; and determining a second minimum cost route from the waypoint to the destination according to the cost function by exploring a third set of segments of the electronic map using a route search algorithm, wherein the third set of segments does not include the second set of segments.

The present invention extends to a system for carrying out a method in accordance with any of the aspects or embodiments of the invention herein described.

In accordance with a further aspect of the invention there is provided a system for generating a route between an origin and a destination through a navigable network in a geographic area via a waypoint, the navigable network being represented by an electronic map comprising a plurality of segments representing navigable segments of the navigable network, the system comprising:

means for determining a first minimum cost route from the origin to the waypoint according to a cost function by exploring a first set of segments of the electronic map using a route search algorithm;

means for identifying the one or more segments forming the first minimum cost route, and defining a second set of segments comprising said identified one or more segments; and means for determining a second minimum cost route from the waypoint to the destination according to the cost function by exploring a third set of segments of the electronic map using a route search algorithm, wherein the third set of segments does not include the second set of segments.

As will be appreciated by those skilled in the art, these further aspects of the present invention can and preferably do include any one or more or all of the preferred and optional features of the invention described herein in respect of any of the other aspects of the invention, as appropriate.

In accordance with these further aspects of the invention, the route is preferably a round trip or "A-A" type route, having an origin and destination that are the same. The applicant has found that the use of these techniques in the context of a route having one or more waypoint, whether a "soft waypoint" of the earlier aspects and embodiments, or a conventional "hard" waypoint, or a combination thereof, may facilitate obtaining a useful round trip type route.

There may be a plurality of waypoints. The or each waypoint may be user specified. The method may comprise the user indicating a plurality of waypoints, and an order of the waypoints. This may be achieved in accordance with any of the techniques discussed in relation to the earlier aspects of the invention.

In embodiments in which the route is to include a plurality of waypoints, the second portion of the route is a portion from a first waypoint to a second waypoint to be encountered along the route. The method may comprise generating one or more further routes between the or each subsequent pair of consecutive waypoints, starting with the second waypoint and third waypoints when present, and a final portion of the route between the final waypoint and the destination, wherein the method comprises preventing any segment connecting nodes of the electronic map indicative of consecutive nodes of the navigable network, which consecutive nodes of the navigable network also form part of a preceding portion of the route, from being included in a further portion of the route.

These further aspects and embodiments are particularly useful where there is only a single waypoint, helping to achieve a roundtrip via the waypoint in which the outward and return paths do not overlap. In some preferred embodiments, there is only a single waypoint, and the second portion of the route is from a first waypoint to the destination.

In accordance with any of the further aspects or embodiments of the invention in which segment(s) are prevented from inclusion in a continuation of a route, this may be achieved by blocking the segment(s) in the route generation process. For example, the segment(s) may be flagged to indicate that they may not be included in the route. In other words, "already visited" segments are flagged. In some embodiments the method comprises the step of flagging the or each segment extending between each pair of nodes of the electronic map indicative of consecutive nodes of the navigable network that are included in the first portion of the route to indicate that the or each segment is not to form part of the second portion of the route.

The or each segment connecting two nodes of the electronic map indicative of consecutive nodes of the navigable network in the real world are prevented from inclusion in the continuation of the route. In many cases segments are bidirectional. Thus, preventing an already travelled segment from forming part of a continuation of the route will prevent the continuation of the route from travelling along the same segment in the reverse direction. However, in some cases, segments connecting consecutive nodes of the navigable network are unidirectional, with segments being provided specifically for use when travelling between the nodes in first and reverse directions. The segments may slightly differ in shape. This may be more common with highway type segments, with multiple carriageways, or where the segments in respect of each direction of travel are separated by a barrier, such as a lake. In accordance with invention, the or each segment connecting two nodes included in the applicable already generated route portion which nodes are indicative of consecutive nodes of the navigable network are prevented from inclusion in the continuation of the route, ensuring that even where the segments for travel in the forward and reverse directions differ, the continuation of the route cannot include a segment corresponding to the path previously travelled. It will be appreciated that the nodes of the electronic map indicative of the consecutive nodes of the navigable network, i.e. real world nodes, will typically also be consecutive nodes, although in some situations the electronic map might include an artificial node between the nodes indicative of the consecutive nodes. Thus the second set of segments may further comprise one or more segments, in addition to the identified segment(s), each of which corresponds to one of the identified segment(s), but allows travel in the opposite direction.

It will be appreciated that in these further aspects of the invention, any one or ones, or the or each waypoint may be a conventional "hard" waypoint, indicative of a specific location to be included in the route, such as a coordinate, POI or segment, or may be a "soft" waypoint, in the form of a defined area through which the route is to pass, as described in relation to the earlier aspects of the invention. A combination of "hard" and "soft" waypoints may be used. In some embodiments, one or more waypoint, (or the or each waypoint) is in the form of a defined area associated with a point location. The point location may be automatically determined or user specified as described in the earlier aspects of the invention. The area may similarly be user specified or automatically defined.

In some embodiments, the first portion of the route is one of a plurality of possible first portions of the route generated between the origin and the first waypoint. Where a plurality of possible first portions of the route are determined, the method may comprise preventing any segment connecting two nodes of the electronic map indicative of consecutive nodes of the navigable network, which consecutive nodes of the navigable network also form part of any one of at least some of the generated plurality of possible first portions of the route from the origin to the first waypoint, from being included in the second portion of the route. The at least some of the plurality of possible first portions of the route may be all of the generated possible first portions of the route, or at least an optimum such route. The method may comprise ranking the generated possible first portions of the route to obtain a subset of the possible first route portions, corresponding to an optimum possible first portion of the route, and one or more next most optimal possible first portions. The at least some first portions may then correspond to the optimum and next most optimal first portions of the route.

The method may then comprise selecting one of the possible first portions of the route as the first portion for inclusion in the final route between the origin and the destination, e.g. the route for output to a user. For example, the optimum one of the plurality of possible first portions may be selected. In other embodiments, the method may comprise generating a plurality of possible portions in respect of each further route portion of the route between the origin and the destination, and selecting ones of the possible portions for the route that together provide the overall optimum route between the origin and the destination. In these embodiments in which a plurality of possible first portions of the route are generated, the second portion of the route may be one of a plurality of possible second portions of the route generated.

The present invention in accordance with its various aspects and embodiments determines optimum routes, and may seek to rank routes relative to one another in terms of optimisation. The routes are assessed by reference to a cost function, as described above.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

In accordance with the invention in any of its aspects or embodiments, once a route has been generated between the origin and destination i.e. an overall or final route, or a portion thereof, the method may comprise outputting data indicative of the route, or portion thereof, to the user. The method may comprise generating navigation instructions for guiding a user along the route, or portion thereof, generated, and/or storing data indicative of the route or portion thereof. The method may alternatively or additionally comprise displaying data indicative of the route or portion thereof to the user. Thus, in the first and second aspects, for the selected one of the set of a plurality of possible routes at the first area, and any subsequent route or routes selected for inclusion in the overall route between the origin and the destination, the method may comprise outputting data indicative of the route to the user, in any of these manners.

Any of the methods in accordance with the present invention may be implemented at least partially using software e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface (s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying Figures, in which:

FIGS. 6A to 6F illustrate the display of a navigation device when implementing methods of generating round trip routes in accordance with the invention at various stages;

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
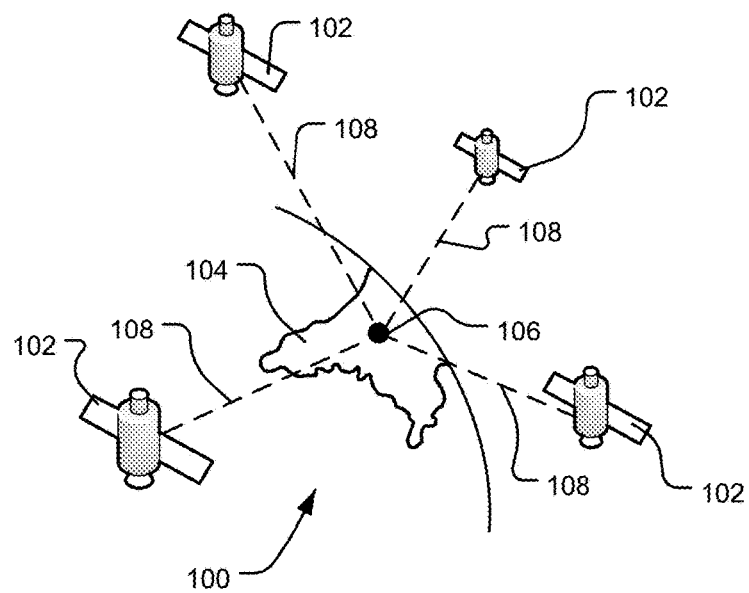
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
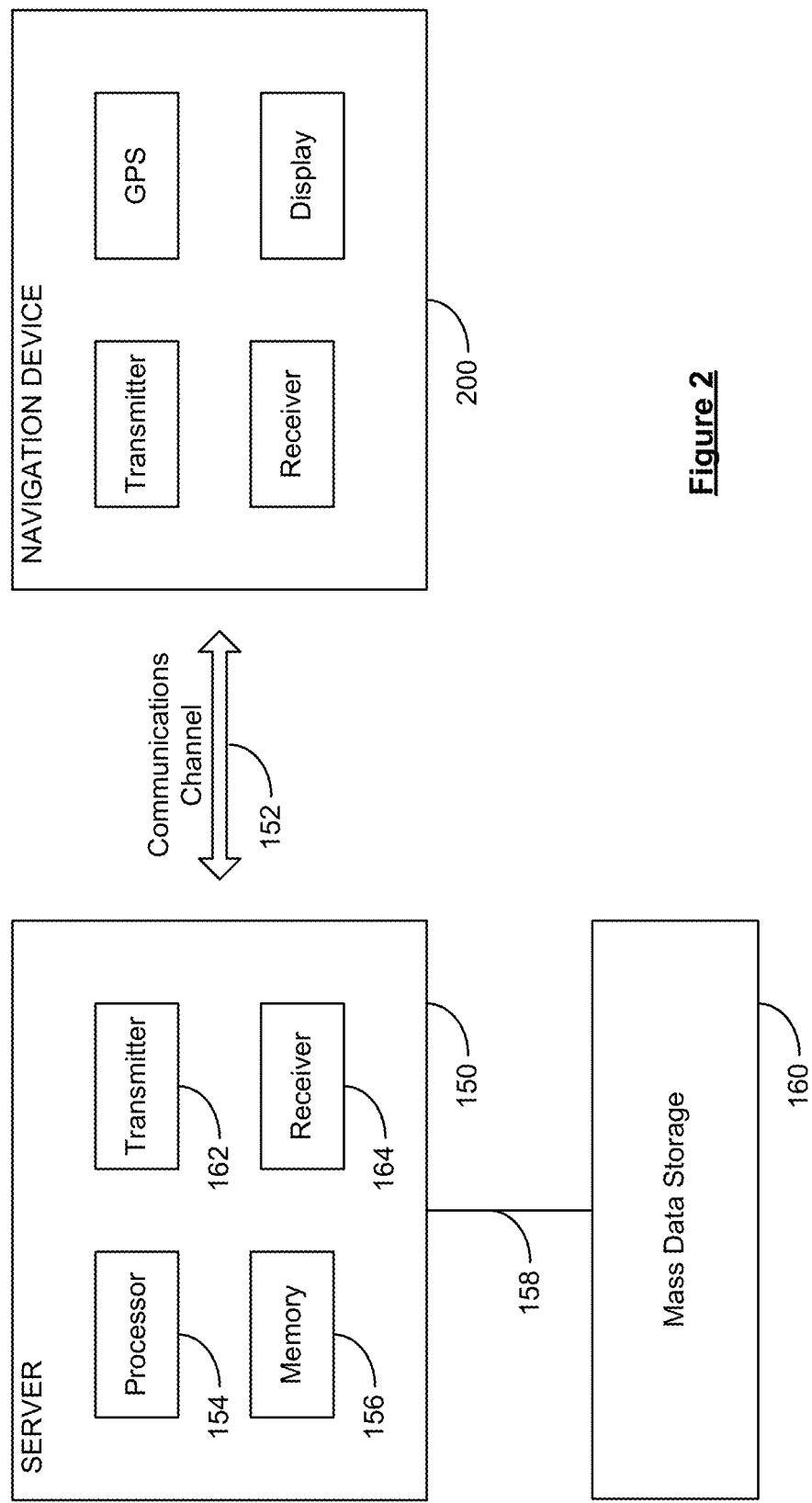
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.). The communication channel 152 is not limited to a particular communication technology.

Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
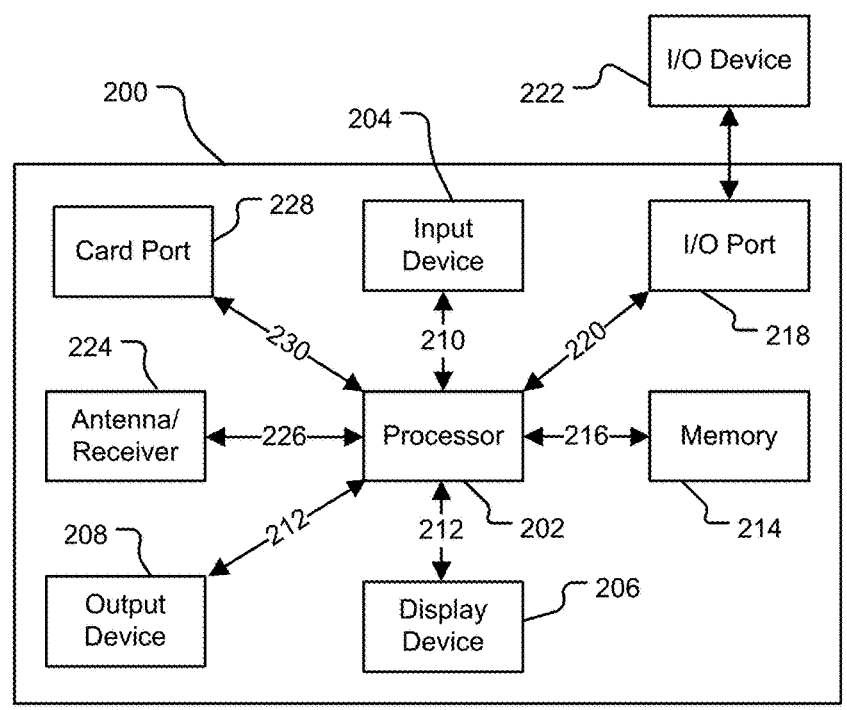
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
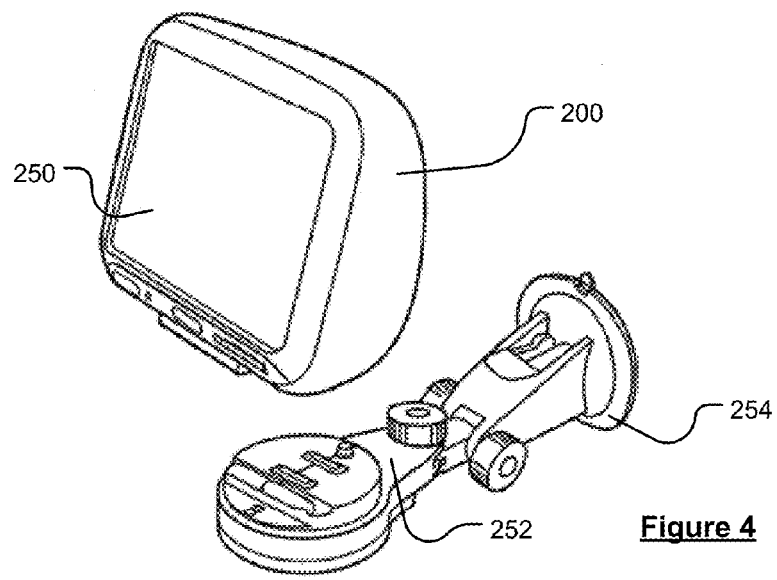
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the navigation device 200 was moving a period of roughly 15 seconds may provide a suitable upper limit.

Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to delete the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data.

As discussed above, the mass data storage 160 also contains map data. Such map data provides information about the location of road segments, points of interest and other such information that is generally found on map.

A method for generating a route for a round trip in accordance with certain embodiments of the invention will now be described.

The invention will be described by reference to arrangements in which the round trip is generated based upon indications may by a user through interaction with an electronic map displayed by a navigation device, such as a PND or integrated in-vehicle device. It will be appreciated that the invention may be implemented without needing to use a specific navigation device, and may be carried out using any system having route planning functionality. Furthermore at least some of the steps might be performed by a server.

Figure 5A:
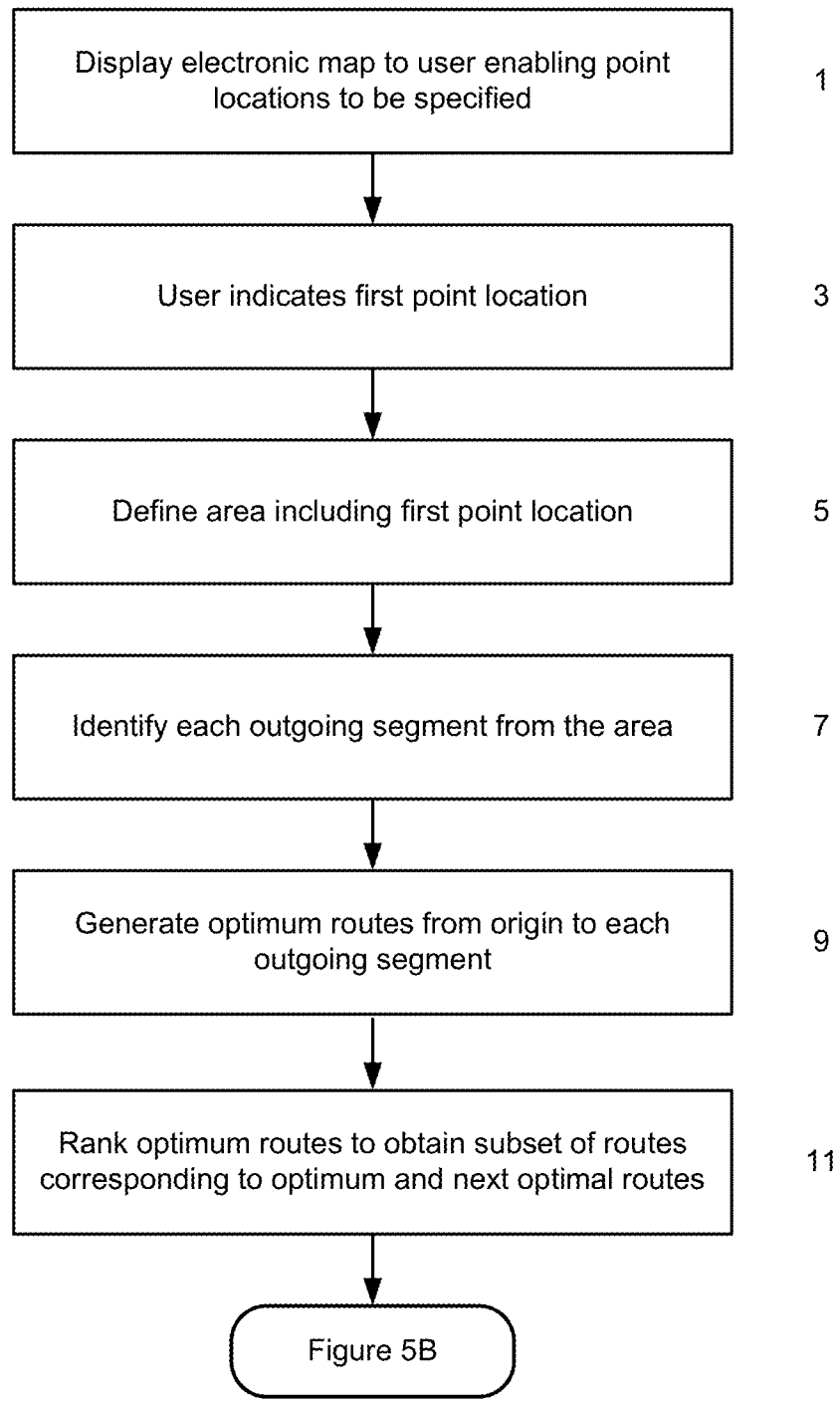
FIGS. 5A and 5B illustrates a method for generating a round trip route via a single soft waypoint in accordance with one exemplary embodiment of the invention.
Figure 5B:
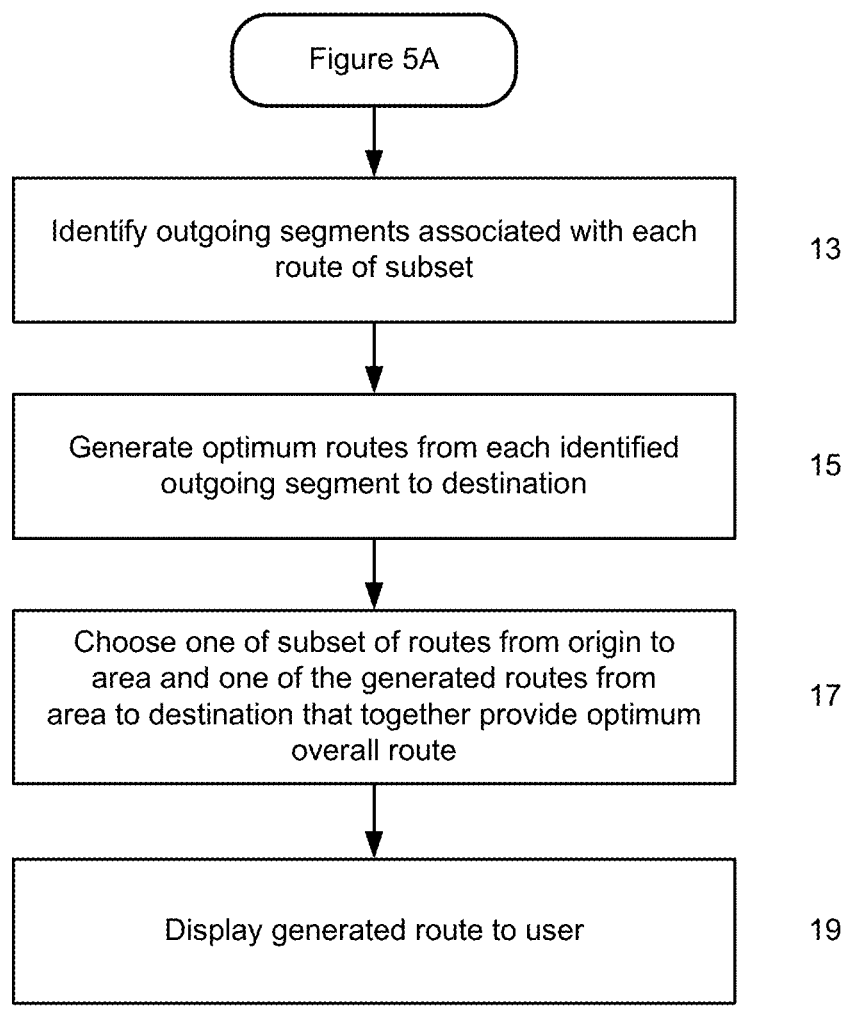

The steps of a method in accordance with one embodiment of the invention will be described with reference to the flow chart of FIGS. 5A and 5B.

The user is presented with a display of an electronic map via a touchscreen of the navigation device, with which the user may interact to specify one or more point locations used to provide "soft waypoints" for a round trip route—step 1. This display and the associated functionality may be obtained when the user selects an appropriate route planning option from a menu of the device. The electronic map is representative of a network of navigable segments, in the form of road segments. One example of such a display is shown in FIG. 6A. An icon 22 is shown on the map, indicating the current position of the user. This is taken to be the origin and destination of the route, unless the user specifies otherwise. The user may scroll or zoom the map as required to specify point locations. In this example, the user taps a point of the screen at point 24 to indicate a point location in a region through which they wish the route to pass—step 3. The point location is not a "hard waypoint", in that the user is not requiring that the route necessarily pass through this specific point. Instead, the point location is indicative of a general region through which the user wishes the route to pass, i.e. a "soft waypoint". The user might alternatively touch a segment of a road, or a point of interest (P01) to indicate a specific location associated with a desired soft waypoint.

FIG. 6B illustrates the map after a first such point location has been added, with a waypoint icon 26 indicating the point location. Although not shown in the illustrated embodiment, the user may touch one or more additional point locations, resulting in further waypoint icons being generated.

Methods of generating routes where there are multiple point locations indicative of soft waypoints are described below.

The user may indicate a direction of travel between the waypoints, e.g. using a suitable gesture, or the direction of travel may be preset as either clockwise or anticlockwise, or, in yet other arrangements, the system may randomly select a direction of travel. Where multiple point locations are selected, an order may be inferred from the order in which they were touched.

In accordance with step 5, where there is only a single point location selected indicative of a waypoint as illustrated, an area is defined including the indicated point location.

In accordance with the invention, when a user touches a point location to indicate a region through which they wish the route to pass, the system automatically defines an area of the electronic map including that point. The area may be in the form of a circle of fixed radius, e.g. 1 km, centred on the touched point location. In other embodiments it is envisaged that rather than being automatically defined, the area including a given point location indicated by a user may also be defined by the user. For example, if the user continues to press the point location, they may be presented with a circle centred on the point location of a radius that gradually increases as long as the user continues to press the point location. When the area is of a desired size, indicating the region that the user wishes to include in the route, i.e. the soft waypoint, the user may stop pressing the point location, thus fixing the size of the area at the desired size.

The present invention relies upon being able to identify multiple outgoing segments at each area indicative of a region to be included in the route i.e. each soft waypoint. The method may involve performing a validity check, to ensure that the area obtained based on an indicated point location, whether automatically or user defined, encompasses a sufficient portion of the navigable network as represented by the electronic map, i.e. so that it includes multiple outgoing segments. For example, if the point location is in the middle of a park, and initial 1 km radius circular area may not encompass any navigable segment, or only a single navigable segment. The radius of the circle may then be increased, e.g. in 1 km steps, until an area covering a suitable portion of the network represented by the electronic map is obtained, i.e. having two or more outgoing segments.

Where multiple point locations have been indicated by the user, an area is defined in respect of each location.

Figure 7:
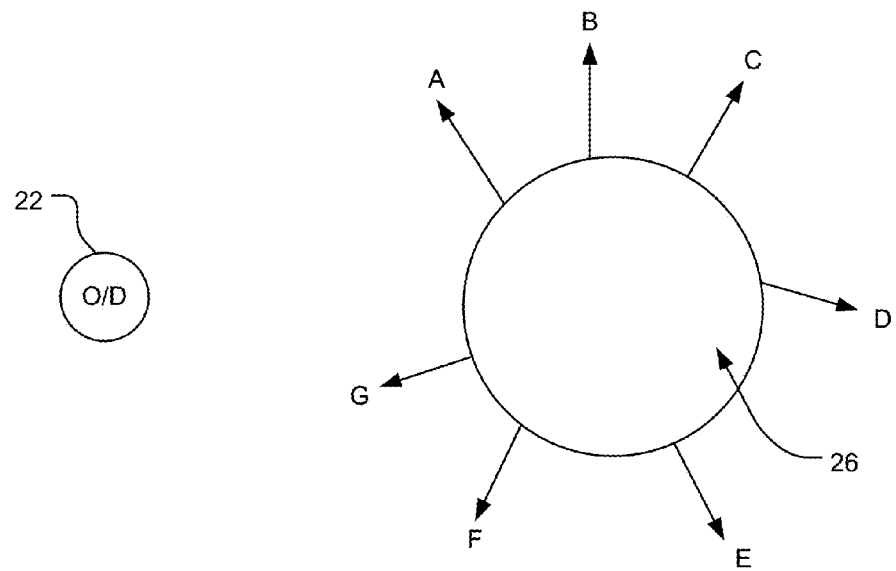
FIG. 7 illustrates the way in which routes are generated between the origin and a first area in accordance with the method of FIGS. 5A and 5B in more detail.

The way in which route generation proceeds will be described by reference to the illustrated example of FIG. 6A in which there is a single soft waypoint 25. In step 7, each outgoing segment from the area associated with the point location 26 is identified. This process is illustrated in FIG. 7. For the purposes of the FIG. 6A embodiment, only the area associated with the first waypoint 26 is present. Here the area representative of the soft waypoint 26 has 7 outgoing segments, labelled A-G. Optimum routes are generated from the origin to each one of these identified outgoing segments to provide a plurality of possible routes from the origin to and through the area—step 9. One of these routes will form the first leg of the desired route. The routes are optimum by reference to the applicable cost function, i.e. are least cost routes. The number of routes obtained will depend upon the number of outgoing segments at the area, and will depend upon factors such as the area size, type of region covered by the area, i.e. whether urban, rural, etc. By way of example, 20 routes might be determined, or 7 as illustrated. As routes are generated from the origin to the outgoing segments of the area, it is guaranteed that the routes will traverse the area, rather than entering the area and immediately leaving. This is the reason that all routes generated to an area are generated to the outgoing segments of the area in embodiments of the invention. The result is that the obtained routes will properly "visit" the areas of interest, specified by the user.

It is then necessary to determine a route from the area associated with the point location 26 to the destination. This is the second, and in this case, final leg of the overall route. In step 11, the plurality of possible route obtained in respect of the first leg of the route from the origin to and through the area, are ranked according to optimisation (based upon the applicable cost function). While each route is an optimum route from the origin to a particular outgoing segment, the routes will be of differing optimisation relative to one another. A subset of the possible routes, including the optimum route, and a limited set of next most optimal routes is identified—step 13. The total number of routes including the optimum and limited set of next most optimal routes may be, by way of example only, 5. By reference to the example of FIG. 7, the optimum route from the origin to and through the area associated with waypoint 26 may be the route to outgoing segment D. The next four most optimal routes may be those to segments A, F and E. The routes from the origin to segments A, D, E and F will then define the subset of possible routes obtained in step 13.

In step 15, optimum routes are determined from the outgoing segments at the area associated with each one of the subset of possible routes to the destination. In the example of FIG. 7, these will be the optimum routes from each of segments A, D, E and F to the origin/destination 22. The routes may be generated sequentially, or in a single pass of the routing algorithm. This will also be the case for any other sets of routes generated as referred to herein. This provides a set of possible routes from the first area to the destination. As the possible routes for this second leg of the route are only determined starting from the subset of outgoing segments at the first area, associated with the optimum and a limited number of next most optimal routes from the origin to the first area, the amount of processing required is limited to a manageable degree. The number of routes in the subset may be selected as desired to provide a balance between creating larger numbers of possible routes for consideration, and keeping processing requirements to a manageable level.

In step 17, one of the subset of possible routes from the origin to the area is chosen, together with a continuation of that route from the area to the destination, which provides the optimum overall route from the origin to the destination. Thus, rather than simply taking an optimum route for the first leg from the origin to the area, and then determining the optimum route to the destination from the outgoing segment associated with the optimum route from the origin to the area, and using these two routes to provide the overall round trip route from the origin to the destination, it has been recognised that the optimum route for one leg of the route may not lead to the optimum overall route when combined with the route providing the second leg of the route. Thus, referring to FIG. 7, it may be found that the optimum route from the origin to the area, being that to outgoing segment D at the area, does not provide the optimum overall route when combined with the continuation of the route from the outgoing segment D back to the origin/destination. Instead, it may be found that the route from the origin to outgoing segment E at the area, and then back to the origin, is in fact the optimum overall route. These preferred embodiments in which routes are selected for each leg from multiple possible routes for each leg enable the overall route to be more effectively optimised. However, in other embodiments it is envisaged that the overall route may be obtained by taking the optimum route from the origin to the area, and then generating an optimum route to the destination from the outgoing segment at the area associated with the optimum route from the origin to the area.

In step 19 a representation of the determined overall route 30 is displayed to the user, as shown in FIG. 6C. It may be seen that directional arrows 32 are indicated at regular intervals along the route. A route information bar 34 is shown in the bottom right of the display. The route information bar 34 shows a duration and length of the route, and includes a "Ride" button. The user may select the "Ride" button to commence navigation along the route. A set of navigation instructions will be generated for guiding the user along the route.

The user may then select the ride button and commence navigation. However, until the user presses the ride button, the screen is still in a mode permitting soft waypoints to be added/deleted or modified. The user may decide to add a further "soft waypoint" to the route. By way of example, if the user taps the displayed map at a location 36, a new soft waypoint indicated by the icon 38 (shown in FIG. 6D) is added. An area associated with the touched location 36 is defined as with the location 24. The representation of the route 30 is no longer displayed, and a new route is calculated taking into account, going via the areas associated with the regions including the touched point locations 24 and 36. A direction of the route is inferred from the order in which the user has touched the point locations (although the user might alternatively indicate a direction, e.g. using a gesture or otherwise).

Figure 8:
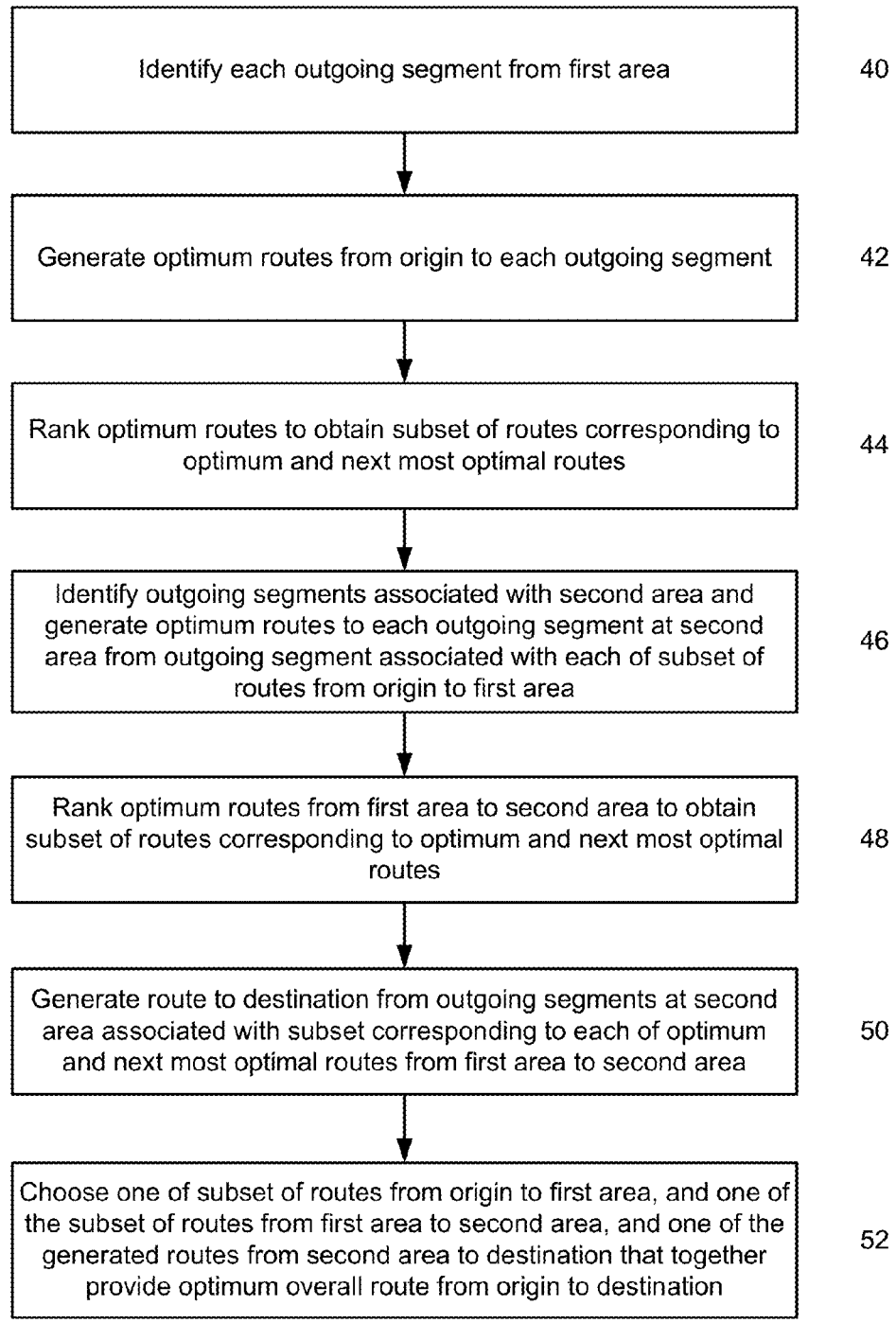
FIG. 8 illustrates a method for generating a round trip route via two soft waypoints in accordance with one exemplary embodiment of the invention.
Figure 9:
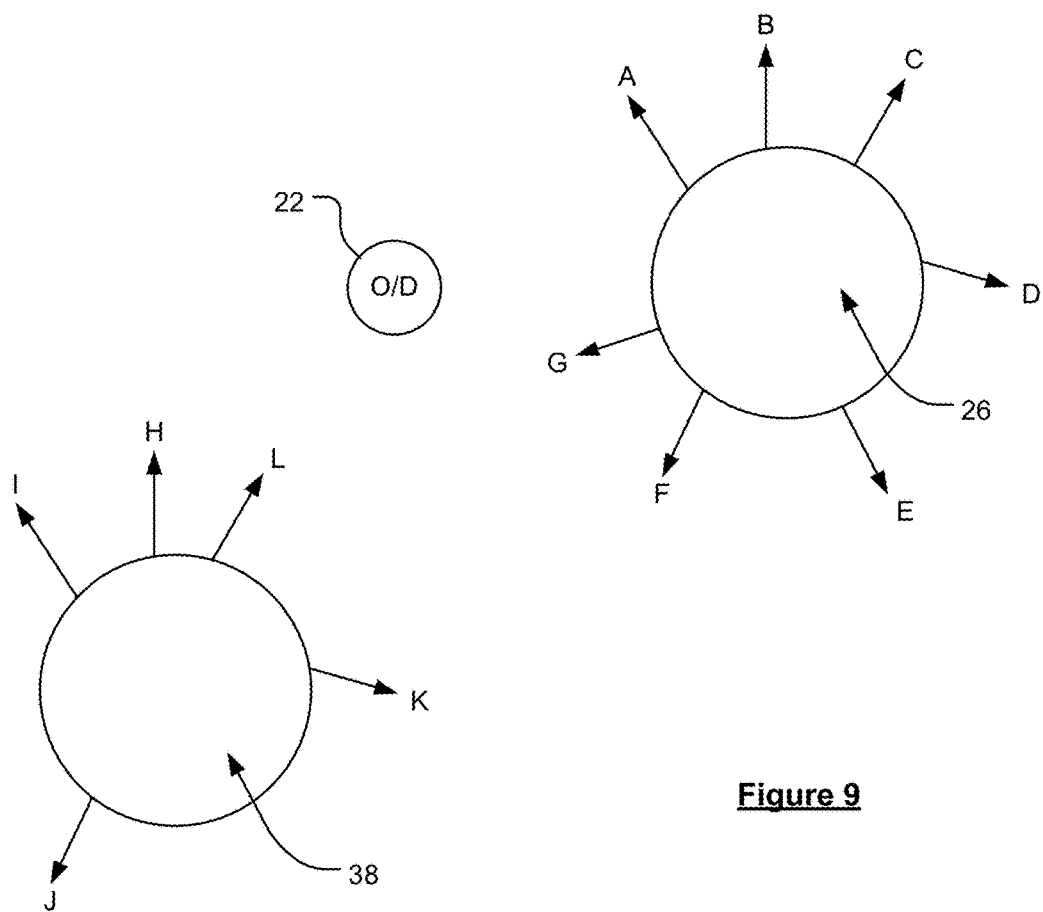
FIG. 9 illustrates the way in which routes are generated between the origin/destination and first and second soft waypoints in accordance with the method of FIG. 8 in more detail.

The way in which a route is generated going via the areas associated with the two point locations will now be described by reference to FIGS. 8 and 9, assuming a clockwise direction of travel. In step 40, each outgoing segment at the first area associated with the first soft waypoint 38 to be encountered along the route is identified. In the FIG. 9 example, these segments are the outgoing segments H, I, J, K and L. An optimum route is generated from the origin to each such outgoing segment to provide a set of a plurality of possible routes (for the first leg of the route), as in the case in which there is a single soft waypoint already described—step 42. Next, the routes are ranked according to optimisation, and a subset of the plurality of possible routes including the optimum route, and a limited number of next most optimal routes is obtained—step 44. By way of example, the subset may correspond to an optimum route being the route to segment L, with the two next most optimal routes being those to segments K and J. Each outgoing segment at the second soft waypoint 26 is identified—step 46. These are segments A-G. An optimum route is then generated from the outgoing segment at the first area associated with each one of the subset of routes to each one of the outgoing segments at the second soft waypoint 26, i.e. the second area—step 46. Thus routes are generated from each one of segments L, K and J to each one of segments A-G. This provides a set of a plurality of possible routes between the first and second areas associated with the first and second waypoints 38 and 26 (the second leg of the route). These routes are then ranked according to optimisation, and a subset of the plurality of possible routes from the first waypoint to the second waypoint including the optimum such route, and a limited number of next most optimal routes is obtained—step 48. For example, in the FIG. 9 arrangement, these routes may be an optimum route from segment K to segment G, and the next two most optimal routes, being from segment K to segment B and segment L to segment F. An optimum route is then generated from the outgoing segment at the second area associated with each one of the subset of routes to the destination (the third and final leg of the overall route)—step 50. Thus, in the FIG. 9 example, routes from segments G, B and F to the origin/destination 22 may be generated. Routes from each subset of possible routes obtained in respect of the different legs of the route i.e. from the origin to the first waypoint 38, from the first waypoint 38 to the second waypoint 26, and from the second waypoint 26 to the destination, are selected which together provide the optimum overall round trip route from the origin to the destination—step 52. Thus, these might be the routes form the origin to segment K, and then on to segment G, and then returning to the origin/destination. Although the optimum route from the origin to the area 38 might be to segment L, in this example, this does not lead to the optimum overall route when its continuation to the second area 26 and back to origin is considered. It will be appreciated that the selection of the second leg will be constrained by the selection of the first leg and so on. Thus, a route from the origin to segment K at the first area will need to be combined with a continuation of the route from K to one of the outgoing segments at the second area and so on. The overall route is confined to a combination of the previously generated routes, i.e. without generating additional routes connecting outgoing segments at an area.

Of course, rather than determining subsets of the possible routes for one leg of the route for use in determining multiple route options for the next leg of the route, instead the route may be made up from the optimum route from the origin to the first area, the optimum route from the outgoing segment associated with that optimum route to an outgoing segment at the second area, and then an optimum route to the destination from outgoing segment at the second area associated with the optimum route leading to the second area.

The overall route 50 is then displayed to the user as shown in FIG. 6E, again with direction indications, as described by reference to FIG. 6E. The length and duration of the new route are shown. The user may then either modify the waypoints again, and this may include deletion or reordering of the waypoints, or may select the "Ride" button. When the user selects the ride button indicating that they wish to accept the proposed route, the route planning mode of the device, in which the user can specify soft waypoints, is ended, and usual navigation mode functionality enabled. A route bar 60 is then shown, showing progress along the route, together with the estimated time of arrival and points of interest/speed cameras along the route. Navigation instructions will be output in the usual way. It can be seen that unlike a conventional "hard" waypoint, being a specific point that must be included in a route, the "soft waypoints" indicated by the user do not appear in the route bar.

It will be appreciated that where more than two soft waypoints are defined, the process described in relation to obtaining routes between the areas associated with the first and second waypoints (referring to FIG. 9) will be repeated for the areas associated with each subsequent pair of waypoints, until there is no further waypoint. A route from the final area to the destination will then be obtained as described in relation to the area associated with the second waypoint, where there are only two waypoints.

Where a user modifies the indicated point locations providing soft waypoints before or while a route according to the previously specified waypoint(s) is still being generated, the route generation process may be stopped, and recommenced based upon the new waypoint indications.

The Applicant has realised that it is desirable to prevent a continuation of a generated route that has passed through a first soft waypoint, i.e. an area defined based upon a user specified point location, from continuing back along the same path. This is particularly, although exclusively, desirable in the context of a round trip route having the same origin and destination, where there is a single soft waypoint. It is clearly undesirable for the second leg of the route from the waypoint to the origin/destination to simply be a reverse of the outgoing leg from the origin/destination to the waypoint. Techniques have been developed to avoid this problem. Although, for ease of reference, the techniques will be described in relation to a route of the type shown in FIG. 6C, which is a round trip route including a single soft waypoint, the techniques are equally applicable to routes including "hard" waypoints, and/or which are not round trips.

The process for obtaining the route in FIG. 6C will be as described by reference to FIG. 7, but with a change at step 15. When generating any one of the routes from an outgoing segment at the area to the destination, any segments connecting consecutive nodes of the road network represented by the electronic map, which consecutive nodes form part of one of subset of the plurality of possible routes from the origin to and through the area (i.e. the optimum and limited number of next optimal routes), are blocked so as to prevent them from inclusion in any of generated routes continuing from the area to the destination. This is done by associating a flag with the segment indicating that lies along a previous route. When generating the continuation of the route, the routing algorithm will disregard any segment that has been flagged. For example, referring to FIG. 7, when generating the routes from the waypoint 26 to the origin/destination, any segments associated with the routes from the origin/destination to outgoing segments A, D, E or F will be blocked, which routes define the subset of possible routes from the origin to the first waypoint.

In this way, any already "visited" segments, at least forming part of one of the subset of routes between the origin and the area, are blocked. It will be appreciated that the forward and reverse paths between consecutive nodes of the network represented by the map (i.e. nodes indicative of real world nodes, rather than artificial nodes present in the electronic map) may follow the same segment i.e. a bidirectional road segment, or may follow different segments, where different segments are provided for travelling between the nodes in the forward and reverse directions. Different segments for each travel direction may be provided in the case of a highway, with the carriageways in each direction having different geometry, or where the segments for travel in each direction are separated by a barrier, such as a lake, etc. Where different segments are provided for travel between consecutive nodes in the opposite directions of travel, these will typically, although not necessarily, be parallel segments. In accordance with the invention, any segment extending between consecutive nodes present in one of the subset of outward routes from the origin to the destination is therefore blocked, whatever its direction, to prevent the continuation of the route following the outward route in reverse. Such segments may be referred to as segments "associated" with the route. Thus the segments that are blocked may include segments that have not already been visited in these situations, which extend between consecutive nodes connected by an already "visited" segment. In a similar way, when there are two soft waypoints, as described with respect to FIG. 9 above, this process will be performed to block segments associated with any one of the subset of routes generated from the origin to the first area 38 from forming part of one of the routes generated from the first area 38 on to the second area 26. When generating routes from the second area 26 to the origin, segments associated with any one of the subset of possible routes obtained from the first area 38 to the second area 26 are flagged so that they are prevented from being included in the routes from the second area to the destination.

Rather than blocking segments associated with each one of the subset of possible routes from the origin to the area when generating the continuation of the route, segments associated with only an optimum one of the possible routes may be blocked. This will be appropriate where, rather than considering the subset of possible routes when generating the next leg of the route, and then selecting a route from among the subset to provide the first leg of the route once route options for the second leg have been determined, the optimum route from the origin to the area is taken as the route for the first leg, and an optimum route generated from the outgoing segment associated with that route at the area to the destination. Where a subset of the plurality of routes from the origin to the area is used in generating the continuation of the route, ideally segments associated with each of these routes should be blocked to prevent the continuation of the route following any of these routes at least initially. As it is possible that any of the subset of the routes may be selected to form part of the final overall route, it is preferable to block segments associated with any one of the routes.

It will be appreciated that these techniques may equally be applied where hard waypoints are used, and/or where a single route is generated for each leg of the route. For example, when a second leg of a route continuing from a hard waypoint is generated, any segment associated with the leg of the route from the origin to that waypoint will be blocked.

In accordance with the present invention in the various embodiments discussed above, the routing algorithm may utilise any suitable cost function. Routes are considered optimum, or ranked in relation to optimisation, according to the applicable cost function. In particular when generating round trip type routes, although not exclusively, it is often more important to provide a route that is interesting to the user, than which provides a fastest or shortest route, e.g. as is often required for A-B type routes. It will be seen that the route planning display shown, e.g. in FIGS. 6A-6E includes a top bar 25, including icons 26 and 27. These icons may be used by the user to specify a desired level of windingness, i.e. curvature, and hilliness, i.e. change in elevation, of the routes generated.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of generating a route through a navigable network in a geographic area, the navigable network being represented by an electronic map comprising a plurality of segments representing navigable elements of the navigable network, the plurality of segments being connected by nodes, and each segment having a traversal direction associated therewith, the method comprising using at least one processor, wherein the processor performs the steps of:
  receiving location data identifying a location represented by the electronic map;
  defining an area represented by the electronic map based on the received location data;
  determining at least some of the outgoing segments from the defined area;
  determining, for each of the determined outgoing segments from the defined area, a first optimum cost route from an origin to the respective outgoing segment using a route planning algorithm, each first optimum cost route having an associated cost;
  selecting at least one of the first optimum cost routes based on the associated cost;
  determining a second optimum cost route to a destination, the second optimum cost route to the destination being determined from the outgoing segment from the area that is included in the at least one selected first optimum cost route; and providing, to a user, at least one of:

data indicative of the generated route, the providing comprising displaying a set of road segments in a map display on a display device with a subset of the set of road segments that are included in the generated route being highlighted or otherwise identified; and navigation instructions for guiding the user along at least a portion of the generated route as the user proceeds along the generated route, wherein the generated route from the origin to the destination comprises the selected first optimum cost route and the second optimum cost route.

2. The method of claim 1, further comprising ranking, using the at least one processor, the determined first optimum cost routes according to their cost, and wherein said selecting of the at least one of the first optimum cost routes is based on the ranking.

3. The method of claim 1, wherein the location data is received from the user.

4. The method of claim 1, wherein the location identified by the location data is a point location, and the area is defined as a circle centred on the point location.

5. The method of claim 1, wherein said defining of the area comprises defining an initial area based on the received location data, determining whether the initial area includes at least a predetermined number of outgoing segments from the area, and, where the area is found not to include at least the predetermined number of outgoing segments, increasing the size of the initial area until the area is found to include at least the predetermined number of outgoing segments from the area.

6. The method of claim 5, wherein the predetermined number of outgoing segments from the area is two outgoing segments.

7. The method of claim 1, wherein the origin is a point location and is one of: (i) a current location of a user; and (ii) a node associated with an outgoing segment from a second defined area.

8. The method of claim 1, wherein said selecting at least one of the first optimum cost routes comprises selecting a set of first optimum cost routes, said set including the first optimum cost route with the lowest associated cost and a predetermined number of first optimum cost routes with the next lowest associated costs.

9. The method of claim 1, wherein the destination is a point location and is one of: (i) a location selected by a user; and (ii) a node associated with an outgoing segment from a second defined area.

10. The method of claim 1, wherein the received location data identifies a plurality of locations indicative of waypoints to be included in the route, and an area is defined for each of said plurality of locations, and the method further comprises receiving data indicative of an order in which the locations along the route are to be traversed.

11. The method of claim 1, wherein each first optimum cost route comprises at least one segment, and the second optimum cost route is determined using a route planning algorithm that prevents any segment of at least one of the first optimum cost routes from forming part of the second optimum cost route.

12. A computing device for generating a route through a navigable network in a geographic area, the navigable network being represented by an electronic map comprising a plurality of segments representing navigable elements of the navigable network, the plurality of segments being connected by nodes, and each segment having a traversal direction associated therewith, the computing device comprising at least one processor and a memory, wherein the at least one processor is arranged to:

receive location data identifying a location represented by the electronic map;

define an area represented by the electronic map based on the received location data; determine at least some of the outgoing segments from the defined area;

determine, for each of the determined outgoing segments from the defined area, a first optimum cost route from an origin to the respective outgoing segment using a route planning algorithm, each first optimum cost route having an associated cost;

select at least one of the first optimum cost routes based on the associated cost;

determine a second optimum cost route to a destination, the second optimum cost route to the destination being determined from the outgoing segment from the area that is included in the at least one selected first optimum cost route; and provide, to a user, at least one of:

data indicative of the generated route, the providing comprising displaying a set of road segments in a map display on a display device with a subset of the set of road segments that are included in the generated route being highlighted or otherwise identified; and navigation instructions for guiding the user along at least a portion of the generated route as the user proceeds along the generated route, wherein the generated route from the origin to the destination comprises the selected first optimum cost route and the second optimum cost route.

13. The computing device of claim 12, wherein the at least one processor is further arranged to rank the determined first optimum cost routes according to their cost, and wherein said selecting of the at least one of the first optimum cost routes is based on the ranking.

14. The computing device of claim 12, wherein the location data is received from the user.

15. The computing device of claim 12, wherein the location identified by the location data is a point location, and the area is defined as a circle centred on the point location.

16. The computing device of claim 12, wherein said defining of the area comprises defining an initial area based on the received location data, determining whether the initial area includes at least a predetermined number of outgoing segments from the area, and, where the area is found not to include at least the predetermined number of outgoing segments, increasing the size of the initial area until the area is found to include at least the predetermined number of outgoing segments from the area.

17. The computing device of claim 12, wherein said selecting at least one of the first optimum cost routes comprises selecting a set of first optimum cost routes, said set including the first optimum cost route with the lowest associated cost and a predetermined number of first optimum cost routes with the next lowest associated costs.

18. The computing device of claim 12, wherein the received location data identifies a plurality of locations indicative of waypoints to be included in the route, and an area is defined for each of said plurality of locations, and the at least one processor is arranged to receive data indicative of an order in which the locations along the route are to be traversed.

19. The computing device of claim 12, wherein each first optimum cost route comprises at least one segment, and the second optimum cost route is determined using a route planning algorithm that prevents any segment of at least one of the first optimum cost routes from forming part of the second optimum cost route.

20. A non-transitory computer readable medium comprising instructions which, when executed by at least one processor of a computing device, cause the computing device to perform a method of generating a route through a navigable network in a geographic area, the navigable network being represented by an electronic map comprising a plurality of segments representing navigable elements of the navigable network, the plurality of segments being connected by nodes, and each segment having a traversal direction associated therewith, the method comprising using at least one processor to:

receive location data identifying a location represented by the electronic map;

define an area represented by the electronic map based on the received location data;

determine at least some of the outgoing segments from the defined area;

determine, for each of the determined outgoing segments from the defined area, a first optimum cost route from an origin to the respective outgoing segment using a route planning algorithm, each first optimum cost route having an associated cost;

select at least one of the first optimum cost routes based on the associated cost;

determine a second optimum cost route to a destination, the second optimum cost route to the destination being determined from the outgoing segment from the area that is included in the at least one selected first optimum cost route; and provide, to a user, at least one of:

data indicative of the generated route, the providing comprising displaying a set of road segments in a map display on a display device with a subset of the set of road segments that are included in the generated route being highlighted or otherwise identified; and navigation instructions for guiding the user along at least a portion of the generated route as the user proceeds along the generated route, wherein the generated route from the origin to the destination comprises the selected first optimum cost route and the second optimum cost route.

* * * * *